US012670423B1

(12) United States Patent
Gonciulea et al.

(10) Patent No.: US 12,670,423 B1
(45) Date of Patent: *Jun. 30, 2026

(54) SYSTEMS AND METHODS FOR QUANTUM COMPUTATION OF AN EXTENDED WEIGHTED SUM OF HASHED VALUES OF A REAL-VALUED FUNCTION

(71) Applicant: Wells Fargo Bank, N.A., San Francisco, CA (US)

(72) Inventors: Constantin Gonciulea, Summit, NJ (US); Vanio Markov, New York, NY (US); Charlee Alexandra Stefanski, New York, NY (US); Abhijit Bhima Rao, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 733 days.

This patent is subject to a terminal disclaimer.

(21) Appl. No.: 18/067,602

(22) Filed: Dec. 16, 2022

(51) Int. Cl.
*G06N 10/20* (2022.01)
*G06F 17/14* (2006.01)

(52) U.S. Cl.
CPC ............. *G06N 10/20* (2022.01); *G06F 17/14* (2013.01)

(58) Field of Classification Search
None
See application file for complete search history.

(56) References Cited

U.S. PATENT DOCUMENTS

| | | | | |
|---|---|---|---|---|
| 11,694,107 | B1 * | 7/2023 | Budinski | G06N 10/20 |
| | | | | 706/62 |
| 2003/0005010 | A1 * | 1/2003 | Cleve | G06N 10/70 |
| | | | | 708/403 |
| 2018/0096258 | A1 * | 4/2018 | Burchard | G06N 10/20 |
| 2020/0089832 | A1 | 3/2020 | Shao | |
| 2020/0334563 | A1 * | 10/2020 | Gambetta | B82Y 10/00 |
| 2020/0342344 | A1 | 10/2020 | Gambetta | |
| 2021/0271477 | A1 * | 9/2021 | Jiang | G06N 10/60 |
| 2021/0357229 | A1 * | 11/2021 | Gonciulea | G06N 10/60 |
| 2023/0030423 | A1 * | 2/2023 | Rubin | G06N 10/40 |

(Continued)

OTHER PUBLICATIONS

Quantum Search Algorithms for Wireless Communications Hung et. al. (Year: 2019).*

(Continued)

*Primary Examiner* — Mandrita Brahmachari
(74) *Attorney, Agent, or Firm* — K&L Gates LLP

(57) ABSTRACT

Systems, apparatuses, and methods are disclosed for a quantum computation of an extended weighted sum of hashed function values. An example method includes initializing two sets of qubits. The example method also includes transforming the initial quantum states of the sets of qubits into a quantum state encoding the weighted sum of the hashed function values using a sequence of operators. The sequence of operators comprises a first operator that encodes a distribution of real-valued weights as quantum amplitudes in the quantum state of the first set of qubits, a second operator that prepares an entangled quantum state encoding a real-valued function, a third operator comprising a series of Hadamard gates, and a fourth operator whose conjugate encodes a real-valued hash function. The example method also includes utilizing the quantum state encoding the weighted sum of the hashed function values.

20 Claims, 8 Drawing Sheets

(56) References Cited

U.S. PATENT DOCUMENTS

| | | |
|---|---|---|
| 2023/0036827 A1 | 2/2023 | Herbert |
| 2024/0183670 A1* | 6/2024 | Ushijima-Mwesigwa .................. G01C 21/3446 |

OTHER PUBLICATIONS

The effect of data encoding on the expressive power of variational quantum machine learning models Schuld et. al. (Year: 2021).*

Vanio Markov, Charlee Stefanski, Abhijit Rao, and Constantin Gonciulea. "A Generalized Quantum Inner Product and Applications to Financial Engineering". 2022.

Lov K Grover. "A fast quantum mechanical algorithm for database search. In Proceedings of the twenty-eighth annual ACM symposium on Theory of computing", pp. 212-219, 1996.

Don Coppersmith. "An approximate fourier transform useful in quantum factoring. Technical Report IBM Research Report RC19642", IBM, 1994.

Austin Gilliam, Charlene Venci, Sreraman Muralidharan, Vitaliy Dorum, Eric May, Rajesh Narasimhan, and Constantin Gonciulea. "Foundational patterns for efficient quantum computing", 2021. URL: https://arxiv.org/abs/1907.11513.

Austin Gilliam, Stefan Woerner, and Constantin Gonciulea. "Grover adaptive search for constrained polynomial binary optimization". Quantum, 5:428, Apr. 2021. ISSN 2521-327X. DOI: 10.22331/q-2021-04-08-428.

Maria Schuld and Nathan Killoran. "Quantum machine learning in feature hilbert spaces". Physical Review Letters, 122(4), Feb. 2019. ISSN 1079-7114. DOI: 10.1103/physrevlett.122.040504.

Ryan O'Donnell. "Analysis of boolean functions". CoRR, abs/2105.10386, 2021. URL: https://arxiv.org/abs/2105.10386.

Steven Herbert. "No quantum speedup with grover-rudolph state preparation for quantum monte carlo integration". Physical Review E, 103(6), Jun. 2021. ISSN 2470-0053. DOI: 10.1103/physreve.103.063302.

Stefan Woerner and Daniel J. Egger. "Quantum risk analysis". npj Quantum Information, 5 (1), Feb. 2019. ISSN 2056-6387. DOI: 10.1038/s41534-019-0130-6.

David H Raab and Edward H Green. "A cosine approximation to the normal distribution". Psychometrika, 26(4):447-450, 1961. ISSN 0033-3123.

Nikitas Stamatopoulos, Daniel J. Egger, Yue Sun, Christa Zoufal, Raban Iten, Ning Shen, and Stefan Woerner. "Option pricing using quantum computers". Quantum, 4:291, Jul. 2020. ISSN 2521-327X. DOI: 10.22331/q-2020-07-06-291.

Harry Buhrman, Richard Cleve, John Watrous, and Ronald de Wolf. "Quantum fingerprinting". Physical Review Letters, 87 (16), Sep. 2001. ISSN 1079-7114. DOI: 10.1103/physrevlett.87.167902.

Seth Lloyd, Masoud Mohseni, and Patrick Rebentrost. "Quantum algorithms for supervised and unsupervised machine learning", 2013.

Francesco Tacchino, Chiara Macchiavello, Dario Gerace, and Daniele Bajoni. "An artificial neuron implemented on an actual quantum processor". npj Quantum Information, 5(1), Mar. 2019. ISSN 2056-6387. DOI: 10.1038/s41534-019-0140-4.

Yunchao Liu, Srinivasan Arunachalam, and Kristan Temme. "A rigorous and robust quantum speed-up in supervised machine learning". CoRR, abs/2010.02174, 2020. URL: http://dblp.uni-trier.de/db/journals/corr/corr2010.html#abs-2010-02174.

* cited by examiner

402

Initialize set of *n* qubits and set of *m* qubits

404

Transpile sequence of operators to obtain transpiled sequence of operators

406

Transform initial quantum state into quantum state encoding extended weighted sum using sequence of operators (see FIG. 4B)

408

Utilize quantum state encoding weighted sum of hashed function values

SYSTEMS AND METHODS FOR QUANTUM COMPUTATION OF AN EXTENDED WEIGHTED SUM OF HASHED VALUES OF A REAL-VALUED FUNCTION

BACKGROUND

Quantum computers promise to provide significant advantages for solving classes of problems that are difficult or costly for classical computers to solve. However, with quantum computing still being a relatively new field compared to classical computing, much work is still needed to deliver solutions to many practical problems using quantum devices. In particular, the inner product or weighted sum are operations used in a wide variety of applications such as finance and machine learning.

BRIEF SUMMARY

Although still in its infancy, quantum computing and its potential applications are of rapidly increasing interest to a broad array of industrial sectors, including complex simulation, artificial intelligence, healthcare, and financial services. Unlike classical computers, which process information in bits that can only represent one of two binary information states at a time, quantum computers process information in quantum bits (qubits) that can represent a coherent superposition of both binary information states at the same time. Two or more qubits may be entangled so that their physical properties are correlated even when separated by large distances, and quantum computers may simultaneously perform a vast number of operations on these entangled qubits. These features allow quantum computers to perform incredibly complex calculations at speeds not realizable today and solve certain classes of problems that are beyond the capability of existing classical computers.

Quantum computing is one of an array of emerging quantum technologies that present a wide field of potential applications. Quantum sensing and quantum communications are expected to have wide-ranging technological impact, and advances in the field of quantum computing may enable or find further applications in these fields.

While quantum computers promise to outperform classical computers on a number of computationally intensive tasks, several hurdles prevent their widespread use. One such hurdle involves finding practical, specific applications that quantum computers can use to obtain a significant advantage over classical computers. One such application that finds widespread use is the inner product, or the related application of the weighted sum. Key areas of financial engineering such as risk management, portfolio optimization, financial data analysis, and machine learning use such operations routinely. Since analysis in these areas is typically performed in very large vector spaces, quantum computing offers great potential to improve the efficiency of certain computations, so there is a need to create systems and methods that efficiently compute weighted sums on quantum computers.

Systems, apparatuses, methods, and computer program products are disclosed herein for quantum computation of an extended weighted sum of hashed function values. The extended weighted sum of hashed function values may include the weighted sum of hashed values of a real-valued function. The quantum computation of extended weighted sums of hashed function values leverages quantum parallelism to achieve a proven speedup over a comparable classical computation. Furthermore, the systems, apparatuses, methods, and computer program products disclosed herein enhance the utility of quantum computers by extending the library of practical applications available. Embodiments disclosed herein allow flexible implementation of weighted sums or inner products on a wide class of input functions, and further permit the use of a hash function to map or restrict values of the function to be summed. Additionally, input functions may be continuous, eliminating the need to approximate real function values by integers, which reduces the precision of the calculation. These solutions thus enable the operation of quantum computers by allowing proven quantum speedup from the quantum Fourier transform and other algorithms to be applied to practical problems involving real-valued functions.

In one example embodiment, a method is given for a quantum computation of an extended weighted sum of hashed function values. The method includes initializing, via state initialization circuitry, a first set of n qubits and a second set of m qubits by preparing the first set of n qubits and the second set of m qubits in initial quantum states. The method also includes transforming, via state transformation circuitry, the initial quantum state of the first set of n qubits and the initial quantum state of the second set of m qubits into a quantum state encoding the extended weighted sum of hashed function values using a first sequence of operators. The method also includes utilizing, via the state transformation circuitry, the quantum state encoding the extended weighted sum of hashed function values with a second sequence of operators, wherein the second sequence of operators alters or transfers the quantum state encoding the extended weighted sum of hashed function values.

In another example embodiment, an apparatus is provided for a quantum computation of an extended weighted sum of hashed function values. The apparatus includes state initialization circuitry configured to initialize a first set of n qubits and a second set of m qubits by preparing the first set of n qubits and the second set of m qubits in initial quantum states. The apparatus also includes state transformation circuitry configured to transform the initial quantum state of the first set of n qubits and the initial quantum state of the second set of m qubits into a quantum state encoding the extended weighted sum of hashed function values using a first sequence of operators. The apparatus includes state transformation circuitry further configured to utilize the quantum state encoding the extended weighted sum of hashed function values with a second sequence of operators, wherein the second sequence of operators alters or transfers the quantum state encoding the extended weighted sum of hashed function values.

In another example embodiment, an apparatus is provided apparatus for a quantum computation of an extended weighted sum of hashed function values. The apparatus includes means for initializing a first set of n qubits and a second set of m qubits by preparing the first set of n qubits and the second set of m qubits in initial quantum states. The apparatus also includes means for transforming the initial quantum state of the first set of n qubits and the initial quantum state of the second set of m qubits into a quantum state encoding the extended weighted sum of hashed function values using a first sequence of operators. The apparatus also includes means for utilizing the quantum state encoding the extended weighted sum of hashed function values with a second sequence of operators, wherein the second sequence of operators alters or transfers the quantum state encoding the extended weighted sum of hashed function values.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Figure 1:
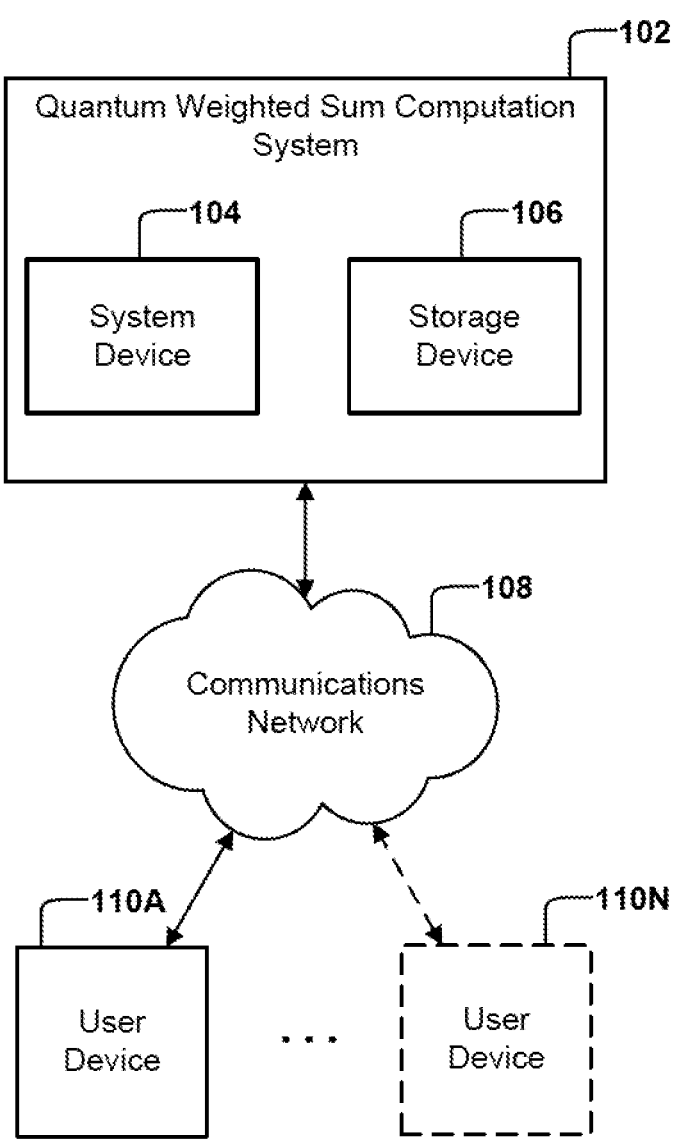
FIG. 1 illustrates a system in which some example embodiments may be used to perform a quantum computation of an extended weighted sum of hashed function values.

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The terms "quantum computing device," "quantum computer," or "quantum device" are used to refer to a specialized computing device which stores and operates on information in quantum states. A quantum computer may make use of the quantum mechanical principles of superposition and entanglement to perform operations that are impossible on classical computers operating on classical information. Quantum computers include devices relying on technologies such as superconducting circuits, trapped ions, atoms in optical lattices, or any other of a wide array of technologies used to prepare and manipulate quantum states. Quantum computers may be gate-based, or perform operations dictated by a quantum circuit, or series of operators or logic gates that represent different transformations on the stored quantum states. A quantum computer may also be realized as a simulated system on a classical computer, though without the intrinsic speedup that a physical quantum computer provides through the use of superposition and entanglement.

The term "qubit" is used to refer to the fundamental unit of data on a quantum computer. A qubit may be initialized into a known quantum state, and the quantum state of the qubit may be manipulated by the quantum computer. The term qubit may refer to a single system with two orthonormal basis states, typically designated 0 and 1, but the term qubit as used here may also include other schemes of representing quantum data such as a qutrit, qudit, or the like which employ a different set of basis states. A plurality of qubits may also form a set of qubits sometimes called a register that when considered together form product basis states that a quantum computer may act on. The term qubit as used here may also include schemes of storing quantum data from non-gate-based quantum computation systems such as adiabatic quantum computers.

The term "quantum circuit" is used to refer to a series of operators on a quantum state of a set of qubits comprising initializations, quantum gates, measurements, and other operations on qubits. A quantum circuit may be realized in various ways depending on the hardware implementation of the quantum computer on which it is executed. A quantum circuit may also be realized as a simulation of a quantum computer on another device.

The term "extended weighted sum of hashed function values" refers to a weighted sum of hashed function values, where the function values may be real-valued. The weighted sum may be written $$\sum_{k=0}^{N-1} w_k h(f(k))$$

where N and M are integers, the weights $w_k$ are real numbers the function $f$ is defined for $\{0, \ldots, N-1\} \rightarrow V_M$, and the hash function h is defined for $V_M \rightarrow \mathbb{R}$ ($V_M$ is defined to be [0, M) to encode non-negative values or [−M/2, M/2) for negative values).

Some example embodiments use the classical interpolation theorem, which is described below. To represent a continuous function $f:[0, T] \rightarrow \mathbb{R}$ where T>0 in an n-bit digital computer, $N=2^n$ values of $f$ may be uniformly sampled into a vector $x=(x_0, \ldots, x_{N-1})$ where $x_k=f(kT/N)$ for k $\in\{0, \ldots, N-1\}$. Although this approach introduces a discretization error, under specific conditions the vector x carries enough information in order to define the function values between the sampling points.

Assuming the Fourier expansion of $f$ is finite:

$$f(t) = \sum_{l=-L}^{L} z_l e^{-i2\pi l \frac{t}{T}}$$

for t∈[0, T] where zi are Fourier coefficients. Such functions ƒ, with a finite frequency spectrum are referred to as band limited. Assuming the vector x contains N=2L+1 uniform samples from the interval [0, T] and y=(y$_0$, . . . , y$_{N-1}$) is the discrete Fourier transform of x, $$y_j = \frac{1}{\sqrt{N}} \sum_{k=0}^{N-1} x_k e^{-i2\pi j \frac{k}{N}}$$

for integers 0≤j≤N.

Using the result that $$z_l = \frac{1}{\sqrt{N}} y_{l+L},$$

a periodic, band-limited function ƒ can be reconstructed at any non-integer t∈[0, T] from N≥2L+1 samples as:

$$f(t) = \frac{1}{N} \sum_{k=0}^{N-1} f\left(k\frac{T}{N}\right) \frac{\sin\left(\pi\left(t-k\frac{T}{N}\right)/\frac{T}{N}\right)}{\sin\left(\pi\left(t-k\frac{T}{N}\right)/T\right)}. \quad (1)$$

As noted above, methods, apparatuses, systems, and computer program products are described herein that provide for quantum computation of extended weighted sum of hashed function values. Traditionally, weighted sums performed on quantum computers could only be computed efficiently for particular small classes of problems, relying on heuristics or other approaches for more generalized weighted sums. Such approaches, particularly when coupled with the complexity of loading input data into the quantum circuit, may not be efficient enough or general enough to offer a quantum advantage over classical computers in a wide variety of applications.

In contrast to previous techniques, example embodiment described herein perform a generalized quantum computation of an extended weighted sum of hashed function values, thus leveraging the quantum speedup provided by quantum parallelism for a large class of inner products, expectation values, mean values, and other related problems. Example embodiments may first initialize two sets of qubits, then may apply a series of transformations to the sets of qubits that encode a distribution of real-valued weights, a real-valued function, and a hash function. Measuring or otherwise utilizing the quantum state prepared may return the sum of values of the real-valued function, hashed by the hash function and weighted by the distribution of real-valued weights. Example embodiments thus may compute inner products, weighted sums, or perform related quantum computations over a general class of real-valued functions, weights, and hash functions.

Accordingly, the present disclosure sets forth systems, methods, and apparatuses that perform a quantum computation of an extended weighted sum of hashed function values. There are many advantages of these and other embodiments described herein. For instance, the weighted sum method disclosed herein allows the calculation of the expected value of any real-valued function, not necessarily linear, when applied with the encoding of a canonical linear function. A linear function may be supplied as the hash function, such that the expected value of any real-valued function may be computed as a special case of the more general method disclosed herein. In addition, the weighted sum method disclosed herein provides a canonical way to implement input function selection, thus calculating value at risk, and a canonical way to implement output value selection, which enables straightforward implementations of comparators needed in option pricing. Input function selection and output value selection may be implemented by the appropriate choice of the real-valued function or hash function using the weighted sum method. Finally, example embodiments directly encode real-valued functions with real values rather than an integer approximation, improving the precision of weighted sum calculations.

Although a high-level explanation of the operations of example embodiments has been provided above, specific details regarding the configuration of such example embodiments are provided below.

System Architecture

Example embodiments described herein may be implemented using any of a variety of computing devices or servers. To this end, FIG. 1 illustrates an example environment within which various embodiments may operate. As illustrated, a quantum weighted sum computation system 102 may include a system device 104 in communication with a storage device 106. Although system device 104 and storage device 106 are described in singular form, some embodiments may utilize more than one system device 104 and/or more than one storage device 106. Additionally, some embodiments of the quantum weighted sum computation system 102 may not require a storage device 106 at all. Whatever the implementation, the quantum weighted sum computation system 102, and its constituent system device 104 and/or storage device 106 may receive and/or transmit information via communications network 108 (e.g., the Internet) with any number of other devices, such as one or more of user device 110A through user device 110N.

The system device 104 may be implemented as one or more servers, which may or may not be physically proximate to other components of the quantum weighted sum computation system 102. Furthermore, some components of system device 104 may be physically proximate to the other components of the quantum weighted sum computation system 102 while other components are not. The system device 104 may receive, process, generate, and transmit data, signals, and electronic information to facilitate the operations of the quantum weighted sum computation system 102. Particular components of system device 104 are described in greater detail below with reference to apparatus 200 in connection with FIG. 2.

The storage device 106 may comprise a distinct component from system device 104, or may comprise an element of system device 104 (e.g., memory 204, as described below in connection with FIG. 2). The storage device 106 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 108). The storage device 106 may host the software executed to operate the quantum weighted sum computation system 102. The storage device 106 may store information relied upon during operation of the quantum weighted sum computation system 102, such as various quantum circuits that may be used by the quantum weighted sum computation system 102, data and documents to be analyzed using the quantum weighted sum computation system 102, or the like. In addition, the storage device 106 may store control signals, device characteristics, and access credentials enabling interaction between the quantum weighted sum computation system 102 and one or more of the user devices 110A-110N.

The one or more user device 110A-110N may be embodied by any computing devices known in the art, such as desktop or laptop computers, tablet devices, smartphones, or the like. The one or more user device 110A-110N need not themselves be independent devices, but may be peripheral devices communicatively coupled to other computing devices.

Although FIG. 1 illustrates an environment and implementation in which the quantum weighted sum computation system 102 interacts with one or more of user device 110A-110N, in some embodiments users may directly interact with the quantum weighted sum computation system 102 (e.g., via communications hardware 206 of system device 104), in which case a separate user device 110 may not be utilized. Whether by way of direct interaction or via a separate user device 110, a user may communicate with, operate, control, modify, or otherwise interact with the quantum weighted sum computation system 102 to perform the various functions and achieve the various benefits described herein.

Example Implementing Apparatuses

Figure 2:
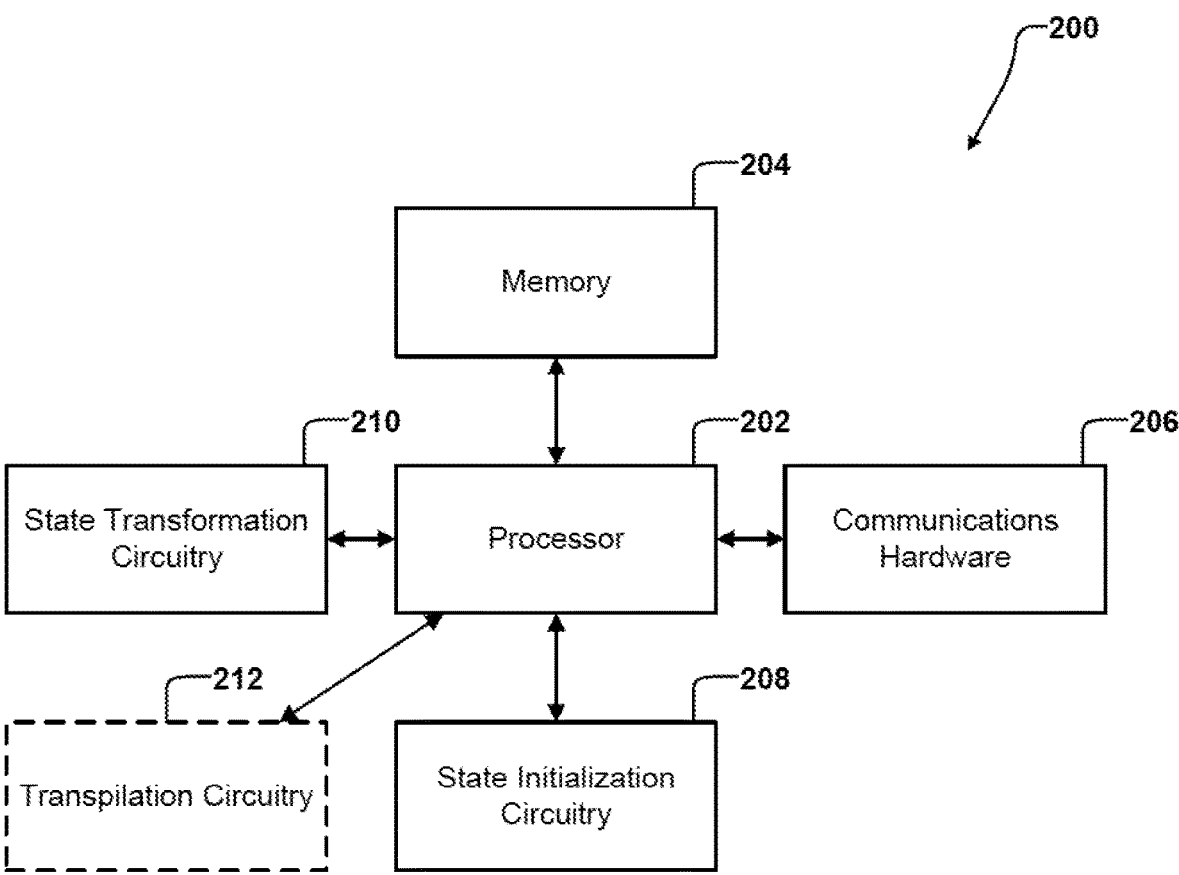
FIG. 2 illustrates a schematic block diagram of example circuitry embodying a device that may perform various operations in accordance with some example embodiments described herein.

The system device 104 of the quantum weighted sum computation system 102 (described previously with reference to FIG. 1) may be embodied by one or more computing devices or servers, shown as apparatus 200 in FIG. 2. As illustrated in FIG. 2, the apparatus 200 may include processor 202, memory 204, communications hardware 206, state initialization circuitry 208, state transformation circuitry 210, and transpilation circuitry 212, each of which will be described in greater detail below. While the various components are only illustrated in FIG. 2 as being connected with processor 202, it will be understood that the apparatus 200 may further comprise a bus (not expressly shown in FIG. 2) for passing information amongst any combination of the various components of the apparatus 200. The apparatus 200 may be configured to execute various operations described above in connection with FIG. 1 and below in connection with FIGS. 4A-4B.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof. The use of the term "processor" may be understood to include a classical processor (e.g., when simulating a quantum computer) or a quantum processor.

The processor 202 may be configured to execute software instructions stored in the memory 204 or otherwise accessible to the processor (e.g., software instructions stored on a separate storage device 106, as illustrated in FIG. 1). In some cases, the processor may be configured to execute hard-coded functionality. As such, whether configured by hardware or software methods, or by a combination of hardware with software, the processor 202 represents an entity (e.g., physically embodied in circuitry) capable of performing operations according to various embodiments of the present invention while configured accordingly. Alternatively, as another example, when the processor 202 is embodied as an executor of quantum circuits or software instructions, the software instructions may specifically configure the processor 202 to perform the algorithms and/or operations described herein when the quantum circuits or software instructions are executed.

The memory 204 is non-transitory and may include, for example, one or more volatile and/or non-volatile memories. In other words, for example, the memory 204 may be an electronic storage device (e.g., a computer readable storage medium). The memory 204 may be quantum memory (QRAM, or quantum random access memory, capable of storing quantum states), classical memory, or a combination thereof. The memory 204 may be configured to store information, data, content, applications, software instructions, or the like, for enabling the apparatus to carry out various functions in accordance with example embodiments contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processing circuitry for causing transmission of such signals to a network or for handling receipt of signals received from a network.

The communications hardware 206 may be configured to provide output to a user and, in some embodiments, to receive an indication of user input. It will be noted that some embodiments will not include such configurations, in which case user input may be received via a separate device such as a user device 110 (shown in FIG. 1). The communications hardware 206 may comprise a user interface, such as a display, and may further comprise the components that govern use of the user interface, such as a web browser, mobile application, dedicated client device, or the like. In some embodiments, the communications hardware 206 may include a keyboard, a mouse, a touch screen, touch areas, soft keys, a microphone, a speaker, and/or other input/output mechanisms. The communications hardware 206 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises a state initialization circuitry 208 that places the set of qubits in an initial quantum state. The state initialization circuitry 208 may utilize processor 202, memory 204, or any other hardware component included in the apparatus 200 to perform these operations, as described in connection with FIGS. 4A-4B below. The state initialization circuitry 208 may further utilize communications hardware 206 to gather data from a variety of sources (e.g., user device 110A through user device 110N or storage device 106, as shown in FIG. 1) or to receive data from a user, and in some embodiments may utilize processor 202 and/or memory 204 to prepare the initial quantum state.

In addition, the apparatus 200 further comprises a state transformation circuitry 210 that applies transformations to the quantum state of the set of qubits. The state transformation circuitry 210 may utilize processor 202, memory 204, or any other hardware component included in the apparatus 200 to perform these operations, as described in connection with FIGS. 4A-4B below. The state transformation circuitry 210 may further utilize communications hardware 206 to gather data from a variety of sources (e.g., user device 110A through user device 110N or storage device 106, as shown in FIG. 1) or to receive data from a user, and in some embodiments may utilize processor 202 and/or memory 204 to transform the quantum state.

Finally, the apparatus 200 may also comprise a transpilation circuitry 212 that transpiles the quantum circuit. The transpilation circuitry 212 may utilize processor 202, memory 204, or any other hardware component included in the apparatus 200 to perform these operations, as described in connection with FIGS. 4A-4B below. The transpilation circuitry 212 may further utilize communications hardware 206 to gather data from a variety of sources (e.g., user device 110A through user device 110N or storage device 106, as shown in FIG. 1) or receive data from a user, and in some embodiments may utilize processor 202 and/or memory 204 to transpile the quantum circuit.

Although components of FIG. 2 are described in part using functional language, it will be understood that the particular implementations necessarily include the use of particular hardware. It should also be understood that certain of these components of FIG. 2 may include similar or common hardware. For example, the state initialization circuitry 208, state transformation circuitry 210, and transpilation circuitry 212 may each at times leverage use of the processor 202, memory 204, or communications hardware 206, such that duplicate hardware is not required to facilitate operation of these physical elements of the apparatus 200 (although dedicated hardware elements may be used for any of these components in some embodiments, such as those in which enhanced parallelism may be desired). Use of the term "circuitry" with respect to elements of the apparatus therefore shall be interpreted as necessarily including the particular hardware configured to perform the functions associated with the particular element being described. Of course, while the term "circuitry" should be understood broadly to include hardware, in some embodiments, the term "circuitry" may in addition refer to software instructions that configure the hardware components of the apparatus 200 to perform the various functions described herein.

Although the state initialization circuitry 208, state transformation circuitry 210, and transpilation circuitry 212 may leverage processor 202, memory 204, or communications hardware 206, as described above, it will be understood that any of these elements of apparatus 200 may include one or more dedicated processor, specially configured field programmable gate array (FPGA), or application specific interface circuit (ASIC) to perform its corresponding functions, and may accordingly leverage processor 202 executing software stored in a memory (e.g., memory 204), memory 204, or communications hardware 206 for enabling any functions not performed by special-purpose hardware elements. In all embodiments, however, it will be understood that the state initialization circuitry 208, state transformation circuitry 210, and transpilation circuitry 212 are implemented via particular machinery designed for performing the functions described herein in connection with such elements of apparatus 200.

In some embodiments, various components of the apparatus 200 may be hosted remotely (e.g., by one or more cloud servers) and thus need not physically reside on the corresponding apparatus 200. Thus, some or all of the functionality described herein may be provided by third party circuitry. For example, a given apparatus 200 may access one or more third party circuitries via any sort of networked connection that facilitates transmission of data and electronic information between the apparatus 200 and the third-party circuitries. In turn, that apparatus 200 may be in remote communication with one or more of the other components described above as comprising the apparatus 200.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatus 200, general principles employed by an example apparatus 200 are discussed below.

Discussion

Figure 3A:
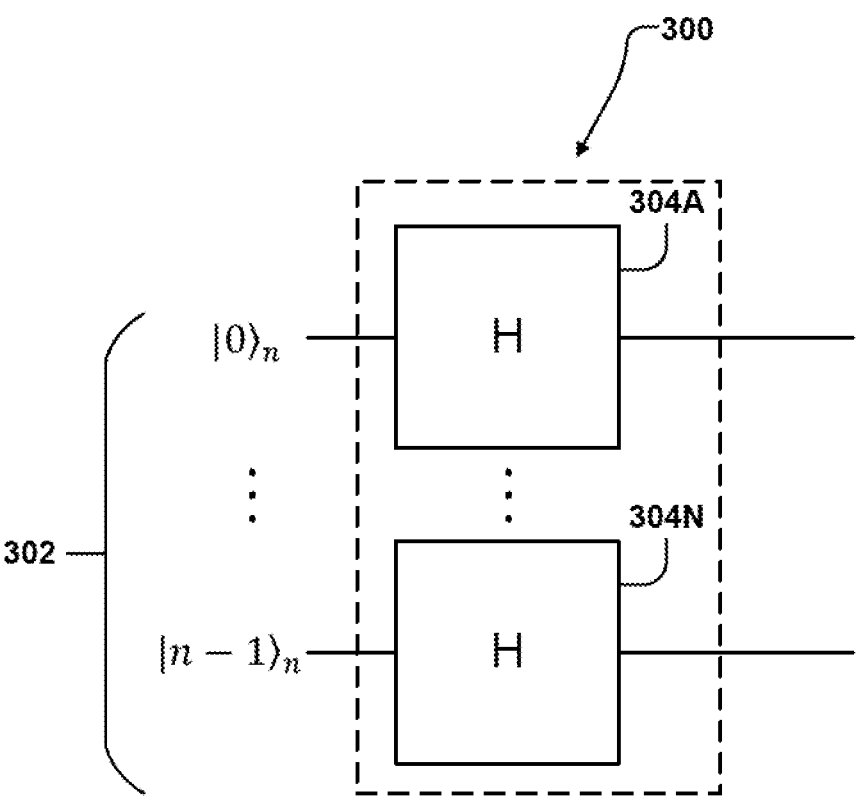
FIG. 3A illustrates an example quantum circuit used in some example embodiments described herein.

Turning to FIG. 3A, an example quantum circuit 300 is depicted for creating a quantum state of equal superposition on a set of n qubits 302, as an example implementation of the apparatus 200 may comprise. In the example circuit 300, a series of Hadamard gate 304A through Hadamard gate 304N are applied to the set of n qubits 302. In embodiments where the set of n qubits 302 are in the initial quantum state, the Hadamard gates 304A through 304N may place the set of n qubits 302 in a quantum state of equal superposition. Individually, the Hadamard gate 304A may apply a transformation that can be described as a rotation of $\pi/2$ about the y-axis, followed by a rotation of $\pi$ about the x-axis. The quantum circuit 300 is referred to as $H^n$, where n is the number of qubits on which the circuit acts.

Figure 3B:
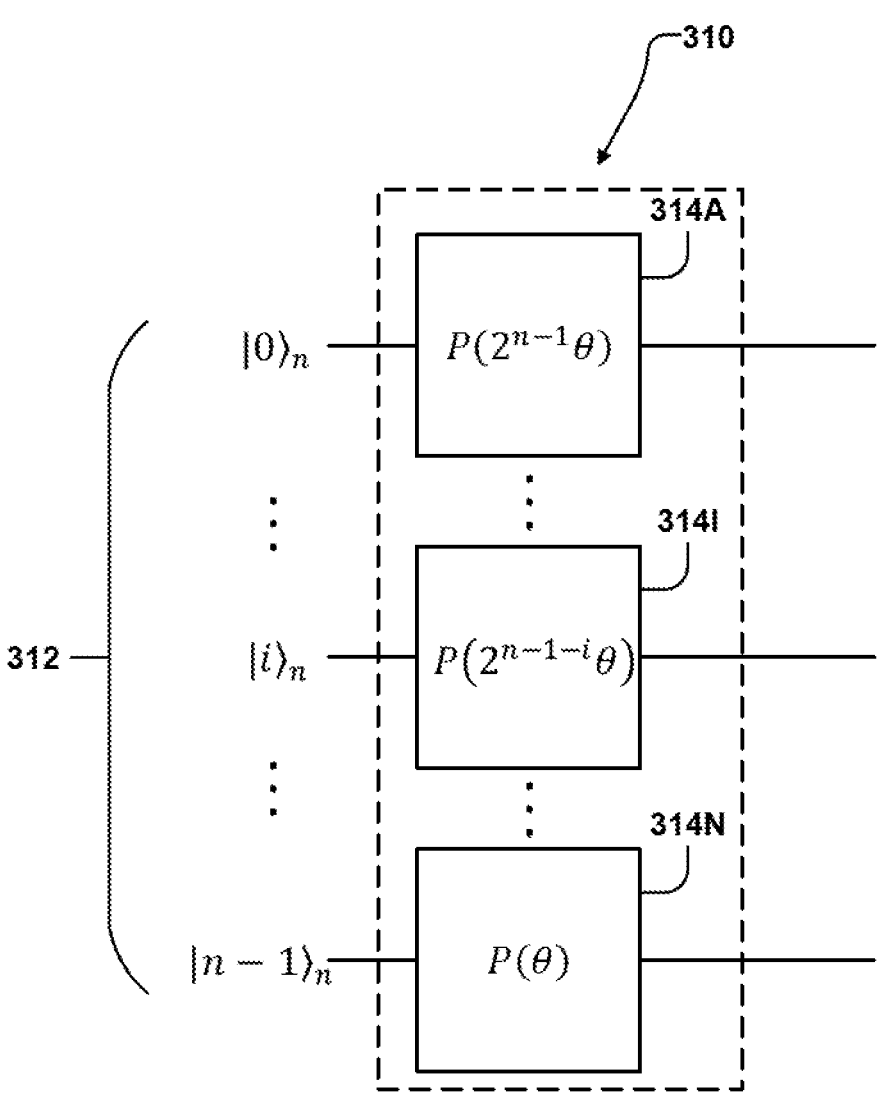
FIG. 3B illustrates an example quantum circuit used in some example embodiments described herein.

Turning to FIG. 3B, an example quantum circuit 310 is depicted for preparing the state |ye⟩ with amplitudes forming a geometric sequence, as an example implementation of the apparatus 200 may comprise. Given a set of n qubits 302 and an angle $\theta \in [-\pi, \pi)$, the quantum circuit 300 depicted in FIG. 3B may encode the state $$|\gamma_\theta\rangle = \frac{1}{\sqrt{N}} \sum_{k=0}^{N-1} e^{ik\theta} |k\rangle_n = \frac{1}{\sqrt{N}} \sum_{k=0}^{N-1} (\cos(k\theta) + i \sin(k\theta)) |k\rangle_n,$$

where $N=2^n$. The quantum circuit 310 is referred to as the composite unitary operator $U_\gamma(\theta)$. The quantum circuit 310 for the operator $U_\gamma(\theta)$ may comprise a series of phase gates 314A through 314N, denoted by P, using multiples of the given angle $\theta\in[-\pi, \pi)$ as the rotation arguments. To represent an example real value $t\in V_M$, the operator $U_\gamma(\theta)$ may be applied to a set of example qubits in equal superposition with $\theta=2\pi t/2^n$, followed by an application of the inverse quantum Fourier transform. Here the notation $V_M=[0, M)$ represents non-negative values, or $V_M=[-M/2, M/2)$ is used to represent negative values with two's complement.

For an integer M and the real number $t\in V_M$, the function $c_{M,t}:\{0, \ldots, M\}\rightarrow \mathbb{R}$ is defined as $$c_{M,t}(k) = \begin{cases} 1, & \text{if } t \text{ is an integer and } k = t \quad (2) \\ 0, & \text{if } t \text{ is an integer and } k \neq t \\ \dfrac{1}{M}\dfrac{\sin(\pi(t-k))}{\sin\left(\dfrac{\pi}{M}(t-k)\right)}, & \text{otherwise.} \end{cases}$$

Figure 3C:
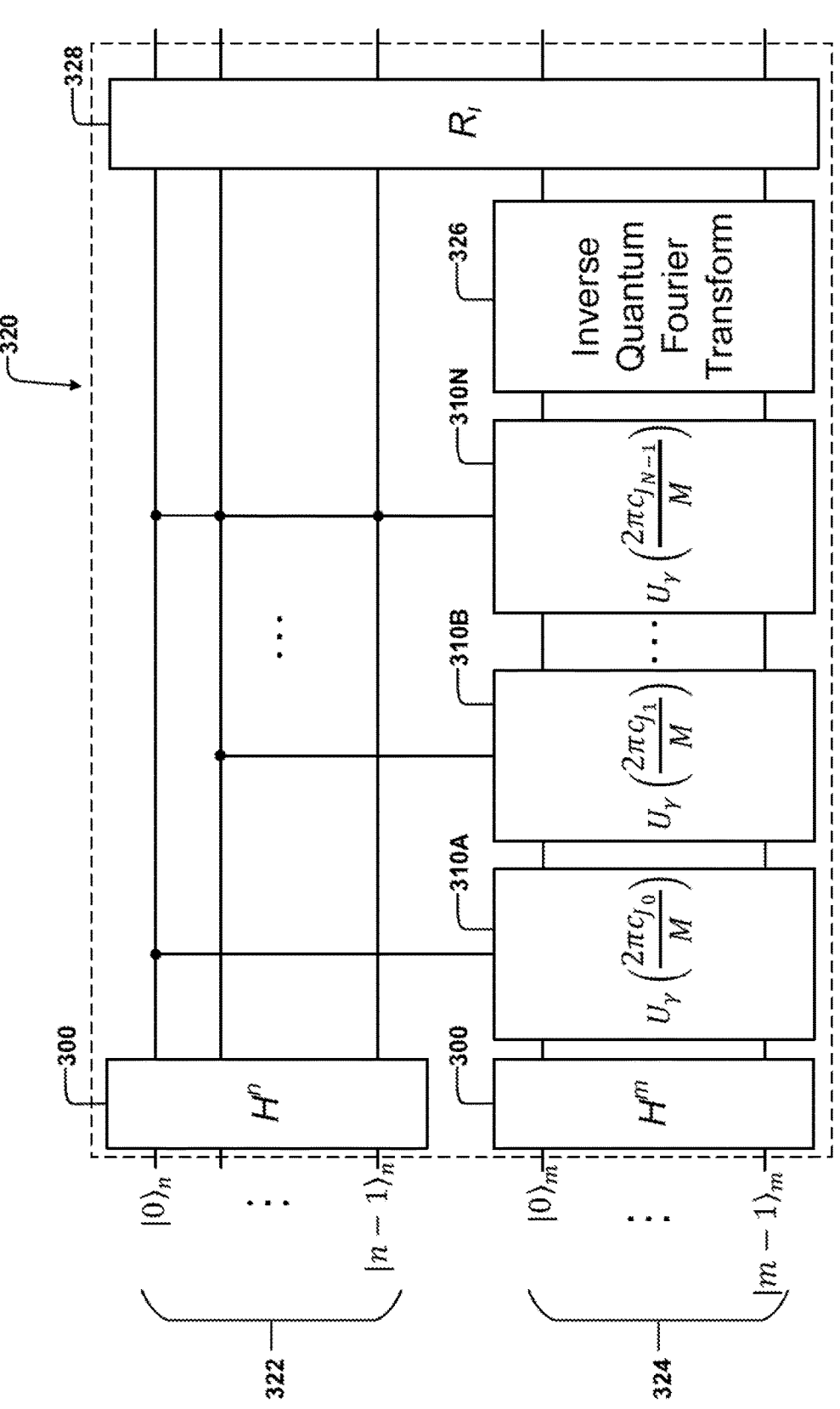
FIG. 3C illustrates an example quantum circuit used in some example embodiments described herein.

Turning to FIG. 3C, an example quantum circuit 320 is depicted, given a set of n key qubits 322 and a set of m value qubits 324, for preparing a quantum state encoding a function $f:\{0, \ldots, N-1\}\rightarrow V_M$ in real-valued amplitudes as an example implementation of the apparatus 200 may comprise. The quantum circuit 320 is referred to as the composite unitary operator F'. Any function $f:\{0, \ldots, N-1\}\rightarrow V_M$ can be represented as a polynomial p of binary variables with real coefficients. The polynomial p of binary variables may be expressed as a sum of monomials $$P(x_0, \ldots, x_{m-1}) = \sum_{i=0}^{M} c_{J_i} \prod_{j\in J_i} x_j,$$

where the set $J_i$ comprises the binary variables appearing in the ith term of the polynomial, $c_{J_i}\in \mathbb{R}$ is the constant term appearing before the ith term of the polynomial, and $x_j\in\{0, 1\}$.

The example circuit 320 may first place the set of n qubits 322 and the set of m qubits 324 in states of equal superposition through the use of the quantum circuit 300. The quantum circuit 320 may apply a series of N instances of the example circuit 310, depicted as unitary operator $$U_\gamma\left(\frac{2\pi c_{J_i}}{M}\right)$$

310A through 310N. The unitary operator 310A through 310N encode the constants $c_{J_i}$ on the set of m value qubits controlled on the set of n key qubits corresponding to the sets $J_i$. The resulting state prepared is $$\frac{1}{\sqrt{N}}\sum_{k=0}^{N-1}|k\rangle_n|\gamma_{f(k)\frac{2\pi}{M}}\rangle_m.$$

An inverse quantum Fourier transform 326 is applied to the set of m value qubits, resulting in the state $$\frac{1}{\sqrt{N}}\sum_{k=0}^{N-1}|k\rangle_n|\phi_{m,f(k)}\rangle_m,$$

where the state $|\phi_{m,t}\rangle$ is the state prepared by applying example circuit 310 on a set of qubits in equal superposition followed by the inverse quantum Fourier transform, and is given by $$|\phi_{m,t}\rangle = \sum_{k=0}^{M-1} e^{ik\frac{M-1}{M}(t-k)} c_{M,t}(k)|k\rangle_m.$$

Finally, an operator $R_l$ 328 that corrects the phase rotations of the final state is applied, resulting in the state $$\frac{1}{\sqrt{N}}\sum_{k=0}^{N-1}|k\rangle_n|t_{m,f(k)}\rangle_m,$$

where the state $|t_{m,t}\rangle$ is given by $$|t_{m,t}\rangle = \sum_{k=0}^{M-1} c_{M,t}(k)|k\rangle_m.$$

The quantum circuit 320 is referred to as F'. F' operates on a set of key qubits and a set of value qubits, entangling the inputs and outputs of a real-valued function over the integers.

Figure 3D:
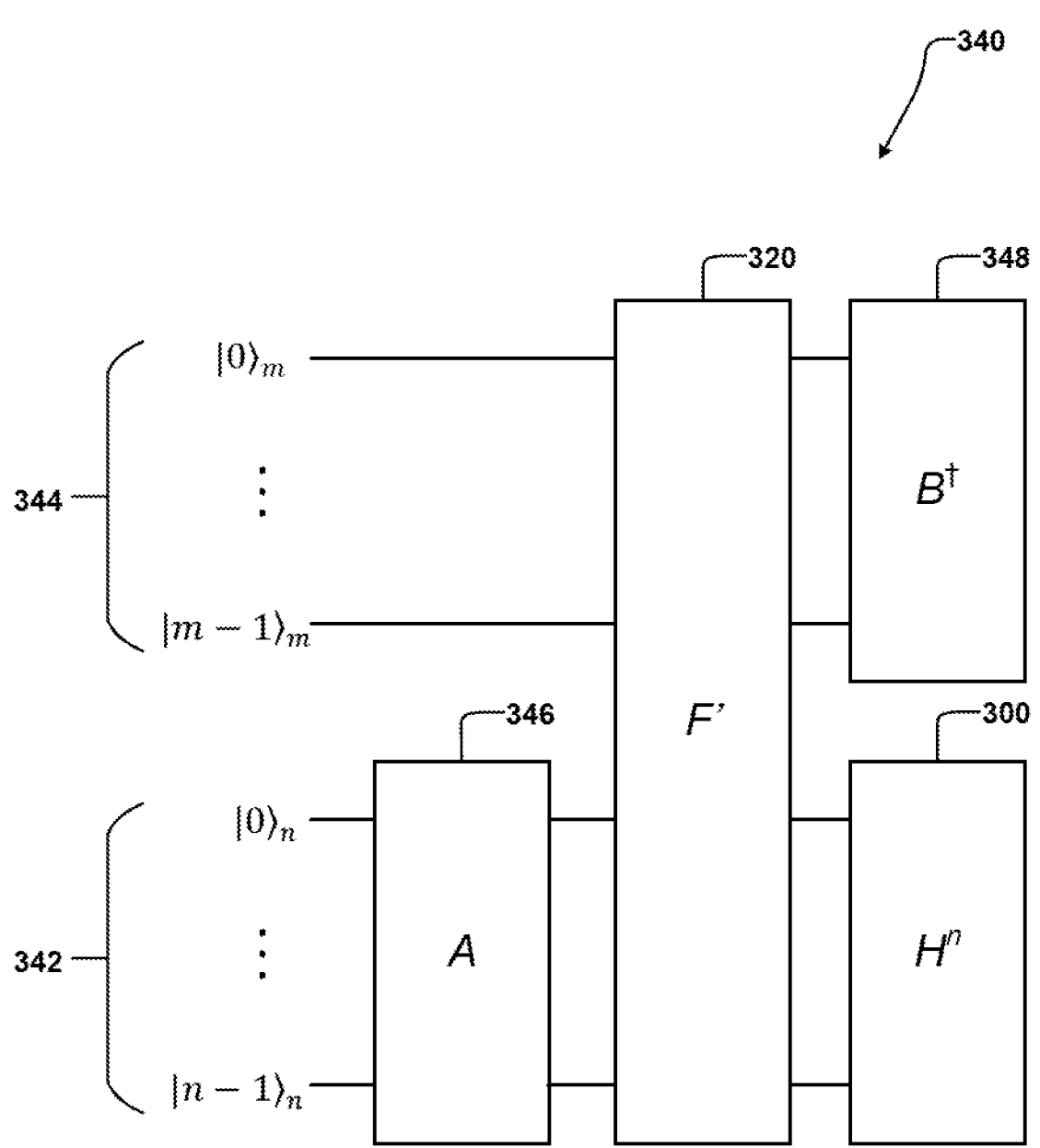
FIG. 3D illustrates an example quantum circuit used in some example embodiments described herein.

Finally, turning to FIG. 3D, an example quantum circuit 340 is depicted for computing an extended weighted sum of hashed function values, as an example implementation of the apparatus 200 may comprise. A set of n key qubits 342 and a set of m value qubits 344, with $N=2^n$ and $M=2^m$, and a real-valued function $f:\{0, \ldots, N-1\}\rightarrow V_M$ that may be represented as a polynomial function of binary variables as described in connection with quantum circuit 320 above are assumed. The operator A 346 is applied to the set of n key qubits, where A encodes a distribution of real-value weights $w_k$, producing the state $$A|0\rangle_n = \sum_{k=0}^{N-1} a_k|k\rangle_n = \sum_{k=0}^{N-1} a w_k|k\rangle_n$$

where a is a common real-valued factor.

The unitary operator F', described previously as quantum circuit 320, is applied on the set of n key qubits 342 and the set of m value qubits 344, and encodes the real-valued function $f$. The unitary operator F' prepares the state $$F'(A \otimes I^m)|0\rangle_{n+m} = F'\left(\sum_{k=0}^{N-1} a_k|k\rangle_n|0\rangle_m\right) = a\sum_{k=0}^{N-1} w_k|k\rangle_n|t_{m,f(k)}\rangle_m$$

where $I^m$ is the identify operator on the set of m value qubits.

The operator B encodes a real-valued hash function h, and prepares the state $$B|0\rangle_m = \sum_{v=0}^{M-1} b_v |v\rangle_m = \sum_{v=0}^{M-1} b\, h(v)|v\rangle_m.$$

Applying the quantum circuit 300 comprising Hadamard gates to the set of n key qubits and the operator B to the set of m value qubits may result in the state $$(H^n \otimes B)|0\rangle_{n+m} = \frac{b}{\sqrt{N}} \sum_{\substack{0 \le k < N \\ 0 \le v < M}} h(v)|k\rangle_n |v\rangle_m. \qquad (3)$$

Since b and h are both real-valued (and noting the Hermitian conjugate of $H^n$ is itself $H^n$), the Hermitian conjugate operation of Equation 3 may be written as $$\langle 0|_{n+m}(H^n \otimes B^\dagger) = \frac{b}{\sqrt{N}} \sum_{\substack{0 \le k < N \\ 0 \le v < M}} h(v)\ \langle k|_n \langle v|_m.$$

The quantum circuit 340 may apply the Hermitian conjugate of the operation described above in Equation 3. Applying operator $B^\dagger$348 and operator $H^n$ 300 then observing the computational zero state amplitude may result in $$\langle 0|_{n+m}(H^n \otimes B^\dagger)F'(A \otimes I^m)|0\rangle_{n+m} = \qquad (4)$$

$$\frac{ab}{\sqrt{N}} \sum_{k=0}^{N-1} w_k \sum_{v=0}^{M-1} h(v)c_{M,f(k)}(v) = \frac{ab}{\sqrt{N}} \sum_{k=0}^{N-1} w_k h(f(k))$$

using the interpolation theorem of Equation 1. The resulting sum gives the extended weighted sum of hashed function values, (or an approximation, if the function is not band-limited or an insufficient number of qubits are available) $h(f(k))$, with constant factor $$\frac{ab}{\sqrt{N}}.$$

Example Apparatus Operations

Figure 4A:
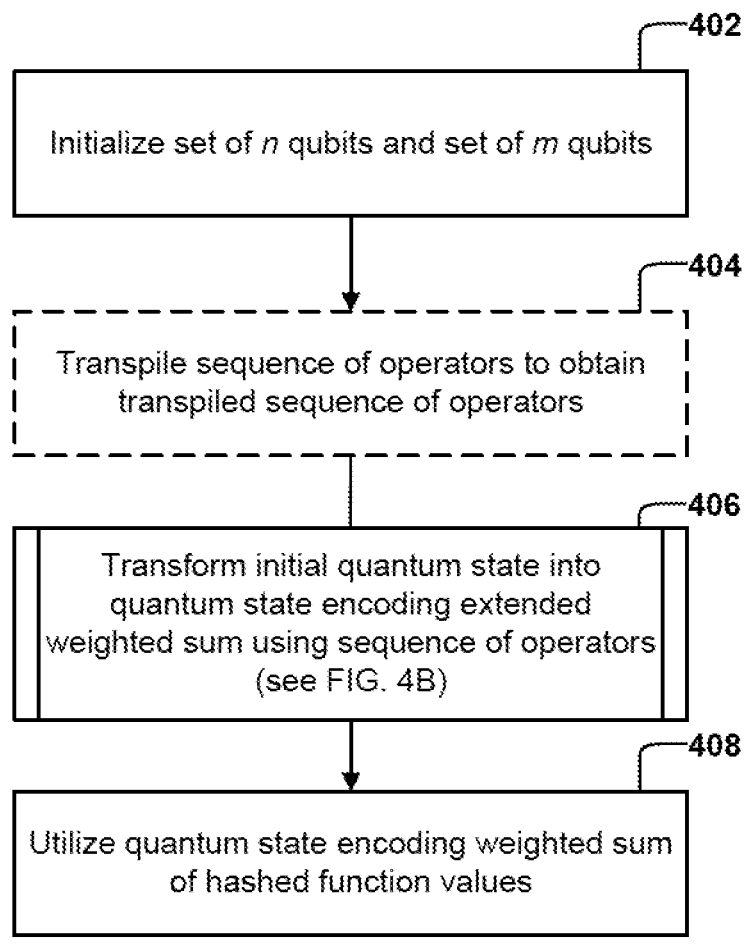
FIG. 4A illustrates an example flowchart for quantum computation of an extended weighted sum of hashed function values, in accordance with some example embodiments described herein.
Figure 4B:
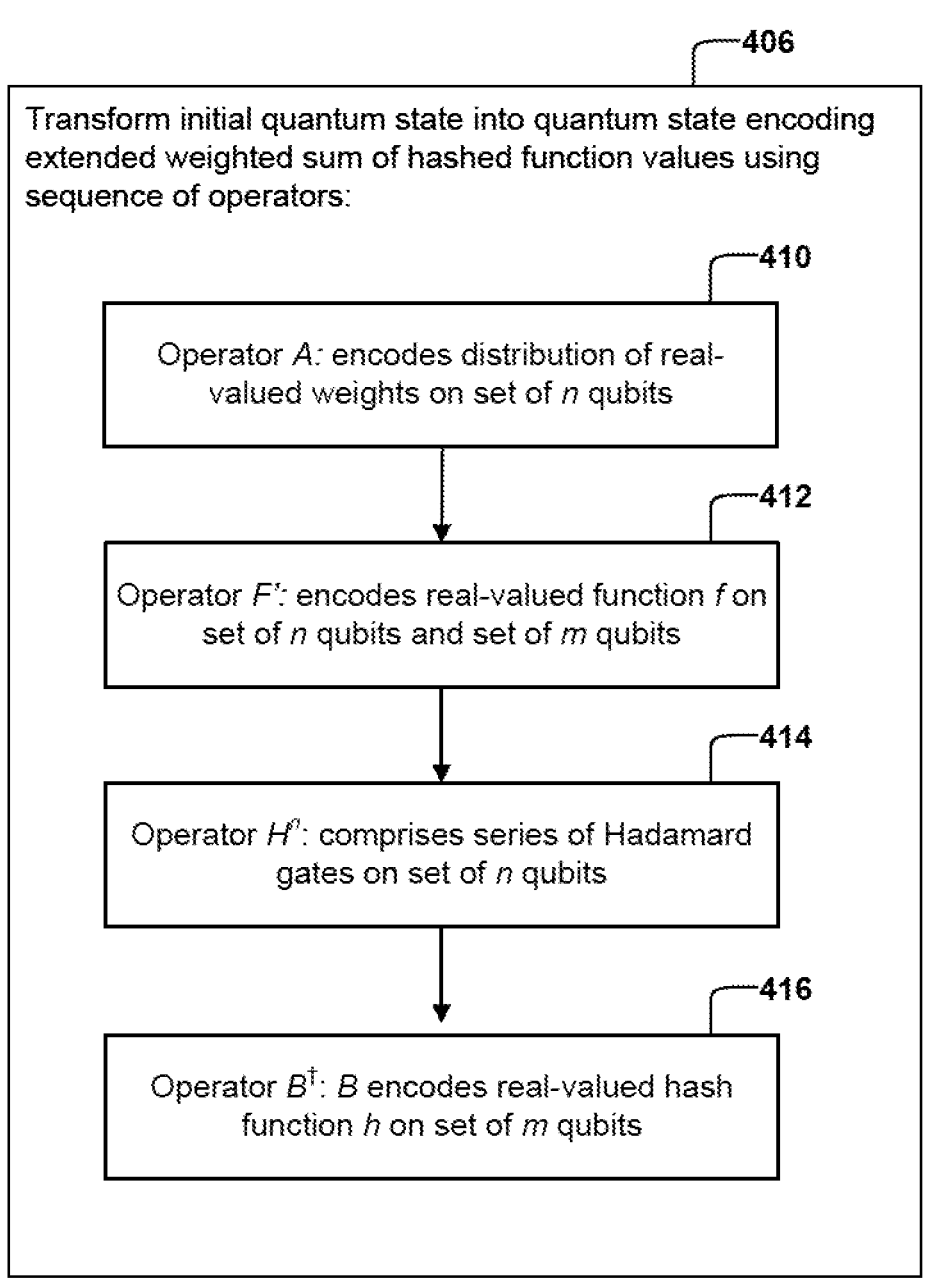
FIG. 4B illustrates an example flowchart for quantum computation of an extended weighted sum of hashed function values, in accordance with some example embodiments described herein.

Turning to FIGS. 4A and 4B, example flowcharts are illustrated that contains example operations implemented by example embodiments described herein. The operations illustrated in FIGS. 4A and 4B may, for example, be performed by system device 104 of the quantum weighted sum computation system 102 shown in FIG. 1, which may in turn be embodied by an apparatus 200, which is shown and described in connection with FIG. 2. To perform the operations described below, the apparatus 200 may utilize one or more of processor 202, memory 204, communications hardware 206, state initialization circuitry 208, state transformation circuitry 210, transpilation circuitry 212, and/or any combination thereof. It will be understood that user interaction with the quantum weighted sum computation system 102 may occur directly via communications hardware 206, or may instead be facilitated by a separate user device (e.g., user device 110A-110N), as shown in FIG.

1, and which may have similar or equivalent physical componentry facilitating such user interaction.

Turning first to FIG. 4A, example operations are shown for a quantum computation of an extended weighted sum of hashed function values.

As shown by operation 402, the apparatus 200 includes means, such as state initialization circuitry 208, or the like, for initializing a first set of n qubits and a second set of m qubits by preparing the first set of n qubits and the second set of m qubits in initial quantum states. The initialization of the first set of n qubits and the second set of m qubits may be a repeatable process, and the initial quantum state may be pre-determined. The first set of n qubits and the second set of m qubits may be in any quantum state prior to being initialized, for example from a previous experiment or from random noise acting on the quantum state of the qubits. The state initialization circuitry 208 may discard the prior quantum state of the sets of qubits during initialization, or may instead cause measurement or transfer of the prior quantum state first. The state initialization circuitry 208 may cause the sets of qubits to move to a known quantum state. In some embodiments, the known quantum state caused by the initialization is a ground state, wherein the qubits exist in their lowest allowed energy configurations. For example, some embodiments may have a characteristic time after which qubits spontaneously move from an energized state to a ground state, after which the system exists in a known state. In some embodiments, the known quantum state caused by the initialization is a polarization state. For example, the state initialization circuitry 208 may polarize light to prepare the first set of n qubits and the second set of m qubits in the initial quantum state.

In some embodiments, the sets of qubits may be simulated, and the initialization of the sets of qubits may proceed by the state initialization circuitry 208 operating on a memory state in a computing device simulating the sets of qubits. In some embodiments where the set of n qubits may be simulated, the initialization of the set of n qubits may be optional or not necessary. The known quantum state caused by the initialization may be any quantum state, for example a state representing a zero on the qubits in the computational basis. The initialization may be a repeatable process in the sense that the same initial quantum state may be prepared by the initialization process when repeated. The initial quantum state may be pre-determined in the sense that the initial quantum state is known prior to performing the initialization.

In some embodiments, the communications hardware 206 may acquire user input providing attributes of the distribution of real-valued weights, the real-valued function $f$, the real-valued hash function h, or a combination thereof. The user input may be provided by text input, via a graphical user interface, via a peripheral device connected to apparatus 200 via the communications hardware 206, or by any other capabilities of the communications hardware 206. The user input may specify attributes of the distribution of real-valued weights such as the number of qubits used to represent the real-valued weights, values of the real-valued weights, a function defining the real-valued weights over an interval, or other attributes. The user input may specify attributes of the real-valued function $f$ such as the number of qubits, values of $f$ at discrete points, the interval over which $f$ is defined, a closed-form definition of $f$; or other attributes. The user input may specify attributes of the real-valued hash function h such as the values of h at discrete points, the interval over which h is defined, a closed-form definition of h, or other attributes. The user input may specify a combination of any attributes described previously, or other attributes defining parameters of the weighted sum computation. The user input may be utilized later in operation 404 and/or operation 406 when the real-valued function $f$ is encoded, or the transpiled sequence of operators to encode the real-valued function $f$ is obtained. The initialization performed in operation 402 may not require the user input, so the acquiring of user input may occur in sequence before, after, or in parallel with operation 402.

As shown by operation 404, the apparatus 200, may contain means, such as communications hardware 206, transpilation circuitry 212, or the like, for transpiling the first sequence of operators to obtain a transpiled quantum circuit. Transpilation here refers to a process analogous to compilation, wherein a set of computer instructions are translated from one language to another. To transpile the first sequence of operators, the transpilation circuitry 212 may make optimizations permitting the first sequence of operators, or quantum circuit, to run efficiently on a certain device, changing the first sequence of operators to match the capabilities of a device or making other changes with the aim of improving performance on a target device. In some embodiments, the transpilation requires information about the attributes of a host device, and this information may be received by the transpilation circuitry 212 via the communications hardware 206. In some embodiments, transpilation may use additional circuitry or take place on another system. For example, the communications hardware 206 may transfer the first sequence of operators to a remote host, and receive a transpiled quantum circuit in response. Alternatively, the transpilation circuitry 212 may locally transpile the first sequence of operators. The transpiled quantum circuit may combine the operators of operation 410, operation 412, operation 414, and operation 416 into a single transpiled quantum circuit. The transpiled quantum circuit may also have a different computational complexity, requiring more or fewer computational steps than the original sequence of operators.

In some embodiments, the first sequence of operators may comprise a set of quantum gates that differs from the set of gates implemented on a quantum computer, referred to as the set of "basis gates" of the quantum computer. The transpilation, in these embodiments, may transform the set of gates in the first sequence of operators to use the set of basis gates in order to enable the first sequence of operators to execute, run, or otherwise be performed by the quantum computer. In some embodiments, the first sequence of operators may run on a simulated quantum computer. The first sequence of operators may be transpiled to run on a simulated quantum computer, for example, in order to test the transpilation process. In these embodiments the set of basis gates may be chosen to test a mode of transpilation, to test the first sequence of operators under a set of basis gates, or for other similar purposes.

In some embodiments, the transpilation circuitry 212 may transpile the second sequence of operators to obtain a transpiled quantum circuit. The transpilation of the second sequence of operators may proceed similarly to the transpilation of the first sequence of operators described above.

In some embodiments, the transpilation circuitry 212 may transpile the first sequence of operators and the second sequence of operators to obtain a transpiled quantum circuit. The transpilation of the first sequence of operators and the second sequence of operators may proceed similarly to the transpilation of the first sequence of operators described above. In some embodiments, the transpilation of the first sequence of operators and the second sequence of operators may result in a transpiled quantum circuit which combines the functions of the two sequences of operators. The combination may remove redundant operators, for example, in a case where the second sequence of operators comprises a quantum Fourier transform, and the first sequence of operators comprises an inverse quantum Fourier transform, under certain orderings of the sequences of operators it may be possible to remove the inverse quantum Fourier transform and the quantum Fourier transform to reduce the computational complexity of the transpiled quantum circuit. In some embodiments, the order of operators in the two sequences of operators may be changed such that the first sequence and second sequence of operators do not appear in a strict ordering in the transpiled quantum circuit, and in some embodiments, it may not be possibly to uniquely assign a certain operator from the transpiled quantum circuit as corresponding to either the first sequence of operators or the second sequence of operators.

As shown by operation 406, the apparatus 200 includes means, such as state transformation circuitry 210, or the like, for transforming the initial quantum state of the first set of n qubits and the initial quantum state of the second set of m qubits into a quantum state encoding the extended weighted sum of hashed function values using a first sequence of operators. The first sequence of operators comprises the operator A, the operator F', the operator H'', and the operator $B^{\dagger}$, described below in detail.

The state transformation circuitry 210 may transform the initial quantum state of the set of qubits by applying a sequence of operators, the sequence of operators comprising a number of quantum gates and/or measurements. A quantum gate may alter the state of one or more qubits in a reversible way. Quantum gates may create superpositions or entanglements of the quantum states of qubits, offering advantages over the more limited operations of classical computers. In some embodiments, measurements may be applied in the course of transforming the initial quantum state. Measurements may alter the quantum state of the qubit being measured by collapsing the wave function, and may provide information about the quantum state to other circuitry.

The transformation may result in the first set of n qubits and the second set of m qubits being in a quantum state that encodes the extended weighted sum of hashed function values. The way in which the quantum state of the first set of n qubits and the second set of m qubits represents the extended weighted sum of hashed function values may depend on the particular embodiment. In some embodiments, the state transformation circuitry 210 may encode information about the extended weighted sum of hashed function values in amplitudes of the basis states of the quantum state of the sets of qubits. The amplitudes may be prepared in such a way as to contain information about the extended weighted sum of hashed function values. The values of the extended weighted sum of hashed function values may be extracted by measuring amplitudes of basis states of the quantum state of the sets of qubits. In some embodiments, other schemes of encoding information from extended weighted sum of hashed function values, and other schemes of obtaining or measuring the value of the extended weighted sum of hashed function values may be employed.

Turning to FIG. 4B, as shown by operation 410, the apparatus 200 includes means, such as state transformation circuitry 210, or the like, for applying the operator A, wherein the operator A encodes a distribution of real-valued weights as quantum amplitudes $a_k$ in the quantum state of the first set of n qubits. For example, the distribution of real-valued weights may be values of a weight function, or a discrete set of weights determined from a dataset. The operator A may be an encoding of a more general function that produces the distribution of real-valued weights, or may be a special-purpose circuit for encoding the weights corresponding to a dataset.

The operator A, which encodes the distribution of real-valued weights as quantum amplitudes, may make use of any of a number of state preparation algorithms. For example, if the distribution of real-valued weights is a log-concave distribution, the Grover-Rudolph method may be employed to encode the distribution of real-valued weights as real amplitudes in the computational basis. In some embodiments, the Grover-Rudolph method may be employed to encode a first approximation of the distribution of real-valued weights on a qubit by applying a quantum gate which rotates the initial state of the qubit about the y-axis by an angle $\theta_0$ which depends on integrals of the distribution of real-valued weights over two equal intervals. The approximation may be improved by adding an ith qubit and a series of further y-rotation gates on the ith qubit made conditional on the qubits of previous iterations. The angles $\theta_i$ of the y-rotations applied to the ith qubit may depend on integrals of the distribution of real-valued weights over subsequently smaller intervals. It will be understood that the Grover-Rudolph method is one example method of approximately representing the distribution of real-valued weights, and various embodiments may utilize other methods of encoding the distribution of real-valued weights.

As shown by operation 412, the apparatus 200 includes means, such as state transformation circuitry 210, or the like, for applying the operator F', where the operator F' transforms the quantum state encoding the distribution of real-valued weights on the first set of n qubits and the initial quantum state of the second set of m qubits into an entangled quantum state encoding a real-valued function $f$ The real-valued function $f$ may be a function that takes an integer as input and returns a real number as output. The real-valued function $f$ may be represented as a polynomial of binary variables for the purposes of encoding $f$ via the operator F'. The operator F', when applied by the state transformation circuitry 210, may comprise a series of operators representing the real number coefficients of the polynomial of binary variables, controlled on qubits representing the variables of a term of the polynomial of binary variables, as described above in connection with FIG. 3C.

The operator F' may further comprise a series of Hadamard gates, a third sequence of unitary operators $U_\gamma(\theta)$, an inverse quantum Fourier transform, and an operator $R_j$ as applied by the state transformation circuitry 210.

The operator F' may comprise the operator $H^{n+m}$ which in turn may comprise a second series of Hadamard gates. The second series of Hadamard gates may act on the first set of n qubits and the second set of m qubits. The operator $H^{n+m}$ when applied by the state transformation circuitry 210 to a set of example qubits in an initial quantum state, may place the set of example qubits in a quantum state of equal superposition. A quantum state of superposition is a feature unique to quantum systems wherein, for example in a two-state system, the 0 and 1 state may both be measured with some probability. In a state of equal superposition, every basis state may be measured with equal probability. The operator $H''$ may comprise a set of n Hadamard gates acting on the first set of n qubits. The term Hadamard gate refers to a quantum gate or operator encoding the Hadamard transform, which can be described as a transformation on the quantum state of a qubit from the computational basis (e.g., 0, 1) into the polar basis (e.g., +, −).

The operator $U_\gamma(\theta)$, when applied by the state transformation circuitry 210 to the second set of m qubits, may prepare a quantum state with amplitudes forming a geometric sequence in powers of $e^{i\theta}$. In some embodiments, the operator $U_\gamma(\theta)$, acting on the second set of m qubits, may comprise a set of m phase rotation gates. The rotation angle of the ith gate acting on the ith qubit may be set to $2^{m-1-i}\theta$. The operator $U_\gamma(\theta)$ may encode multiples of the angle $\theta$ in the quantum state of the set of m qubits, and thus may encode the value of a real number as a geometric sequence. The length of the geometric sequence may depend on the number of qubits, m, and thus implementations with larger values of n may encode more information and greater precision of the value of the real number encoded. The operator $U_\gamma(\theta)$ may be controlled on a subset of qubits from the first set of n qubits. The control may be analogous to a classical controlled logic gate that operates when all control bits are set to 1 and does not operate when a control bit is set to 0. The third sequence of unitary operators $U_\gamma(\theta)$ may together encode coefficients and terms of a polynomial p of binary variables, and the polynomial p of binary values may be equivalent to the real-valued function $f$.

The inverse quantum Fourier transform, when applied to the second set of m qubits in the quantum state with amplitudes forming a geometric sequence representing the real-valued function $f$ may prepare a quantum state encoding the real-valued function $f$ in complex-valued amplitudes. The quantum Fourier transform is the quantum computing algorithm analogous to the discrete Fourier transform, and the inverse quantum Fourier transform is the inverse operation of the quantum Fourier transform. Applying the inverse quantum Fourier transform to the set of n qubits may be achieved by the state transformation circuitry 210 applying a sequence of operations, the sequence of operations comprising a number of quantum gates and measurements. In some embodiments, the inverse quantum Fourier transform may be implemented more efficiently than the analogous classical inverse Fourier transform, which may require exponentially more computational operations scaling with the number of qubits or bits.

Finally, the operator F' may comprise an operator $R_j$. The operator $R_j$, when applied by the state transformation circuitry 210 to the set of n qubits and/or the set of m qubits in a quantum state encoding a real number in basis states, removes phase rotations such that the resulting quantum state has real-valued quantum amplitudes. The amplitudes of the quantum state produced after the state transformation circuitry 210 applies the inverse quantum Fourier transform may be in the form of complex values with real and imaginary parts. The complex values may have magnitudes such that the largest magnitudes correspond to the real value t encoded in the quantum state. The complex values may also have complex phases that do not carry useful information to encode the real value t. The operator $R_j$ may apply corrections to the complex amplitudes such that the complex phases that do not carry useful information to encode the real value t are removed, preserving the magnitudes as well as the outcome probability distribution of the quantum state.

As shown by operation 414, the apparatus 200 includes means, such as state transformation circuitry 210, or the like, for applying the operator $H''$, where the operator $H''$ comprises a series of Hadamard gates. The operator $H''$, when applied by the state transformation circuitry 210 to a set of example qubits in an initial quantum state, may place the set of example qubits in a quantum state of equal superposition.

A quantum state of superposition is a feature unique to quantum systems wherein, for example in a two-state system, the 0 and 1 state may both be measured with some probability. In a state of equal superposition, every basis state may be measured with equal probability. The operator $H^n$ may comprise a set of n Hadamard gates acting on the first set of n qubits. The term Hadamard gate refers to a quantum gate or operator encoding the Hadamard transform, which can be described as a transformation on the quantum state of a qubit from the computational basis (e.g. 0, 1) into the polar basis (e.g. +, −).

As shown by operation 416, the apparatus 200 includes means, such as state transformation circuitry 210, or the like, for applying the operator $B^\dagger$, where the operator $B^\dagger$ is the Hermitian conjugate of an operator B that encodes a real-valued hash function h as quantum amplitudes $b_v$. Applying the operators $H^n$ and $B_+$ to the first set of n qubits and second set of m qubits in the entangled quantum state results in the quantum state encoding the extended weighted sum of hashed function values. In some embodiments, the operator B may be specified, and the state transformation circuitry 210 may perform the operation needed to derive the operator $B^\dagger$. The Hermitian conjugate of the operator B may be computed by modifying the order of the operators B comprises and taking the Hermitian conjugates of the individual operators. The state transformation circuitry 210 may apply the operator $B^\dagger$ to the second set of m qubits in the entangled quantum state in order to compute the extended weighted sum of hashed function values for the real-valued hash function h encoded by B.

The real-valued hash function h may take as input an integer value and return as output a real number. The real-valued hash function h may be described as a hash of the real-valued function $f$ because it may map the real-valued outputs of $f$ to a second set of real numbers. In some embodiments, the real-valued hash function may be the identity function, if the real-valued function $f$ is to be used in the quantum computation without any further hashing (e.g. $h(f(k))=f(k)$). In some embodiments, the real-valued hash function h may be used to restrict the domain or range of the real-valued function $f$ by re-mapping or mapping to zero certain function values. For example, appropriate choices of $f$ and h may be used to compute restricted sums over subsets of the full range of possible sums.

The operator B, which encodes the real-valued hash function h as quantum amplitudes, may make use of any of a number of state preparation algorithms. For example, if h is a log-concave distribution, the Grover-Rudolph method may be employed to encode h as real amplitudes in the computational basis. In some embodiments, the Grover-Rudolph method may be employed to encode a first approximation of h on a qubit by applying a quantum gate which rotates the initial state of the qubit about the y-axis by an angle $\theta_0$ which depends on integrals of the function h over two equal intervals. The approximation may be improved by adding an ith qubit and a series of further y-rotation gates on the ith qubit made conditional on the qubits of previous iterations. The angles $\theta_i$ of the y-rotations applied to the ith qubit may depend on integrals of the function h over subsequently smaller intervals. It will be understood that the Grover-Rudolph method is one example method of approximately representing the real-valued hash function h, and various embodiments may utilize other methods of encoding the real-valued hash function h.

In some embodiments, transforming the initial quantum state of the first set of n qubits and the initial quantum state of the second set of m qubits into the quantum state encoding the extended weighted sum of hashed function values may be caused by the transpiled quantum circuit. In these embodiments, the transformation utilizing the transpiled sequence of operators may prepare the quantum state encoding the extended weighted sum of hashed function values but may use a different set or ordering of quantum gates than the original sequence of operators that was not transpiled. The transformation utilizing the transpiled sequence of operators may or may not be realizable on various types of quantum computer hardware depending on the method of transpilation used.

In some embodiments, utilizing the quantum state representing the extended weighted sum of hashed function values may be caused by the transpiled quantum circuit. In these embodiments, the transpiled quantum circuit may utilize the quantum state representing the extended weighted sum of hashed function values to obtain the same results as the pre-transpiled utilization, but may use a different set of quantum gates. The transpiled quantum circuit may be realizable on certain quantum computer hardware depending on the method of transpilation used.

In some embodiments, transforming the initial quantum state of the first set of n qubits and the initial quantum state of the second set of m qubits into the quantum state representing the extended weighted sum of hashed function values and utilizing the quantum state representing the extended weighted sum of hashed function values may be caused by the transpiled quantum circuit. In these embodiments, the transpiled quantum circuit may transform and utilize to obtain the same results as the pre-transpiled transforming and utilizing, but may use a different set of quantum gates and other operations than the original transforming and utilizing that were not transpiled. The transpiled quantum circuit may be realizable on certain quantum computer hardware depending on the method of transpilation used. The effects of transforming and utilizing may in some embodiments be combined in the transpiled quantum circuit, and certain operations of either transforming or utilizing may be rendered redundant in the combination and eliminated to improve the efficiency of the transpiled circuit.

In some embodiments, the state transformation circuitry 210 may transform the initial quantum state of the first set of n qubits and the initial quantum state of the second set of m qubits utilizing the attributes acquired from the user input. The transformation may take on properties such as the number of qubits to use, the precision of the real-valued function $f$, the values of $f$ at a number of discrete points, or other such properties. In taking on these properties, the state transformation circuitry 210 may utilize a set of quantum gates or other operations, or change parameters such as the number of qubits depending on the user input.

In some embodiments, the extended weighted sum of hashed function values may be an expected value of the real-valued function $f$ For example, the real-valued hash function h may be an identity function, or $h(v)=v$ for $0 \leq v \leq M$ where $M=2^m$. In this case the hashed function values $h(f(k))$ equal the real-valued function values $f(k)$, and the weighted sum value given in Equation 4 may be computed with $$b = \frac{1}{\sqrt{\sum_{v=0}^{M-1} v^2}} = \sqrt{\frac{6}{(M-1)M(2M-1)}},$$

giving the expected value $$\sum_{k=0}^{N-1} w_k f(k) = \frac{\sqrt{N}}{a} \sqrt{\frac{(M-1)M(2M-1)}{6}} E_{|0\rangle},$$

where $E_{|0\rangle} = \langle 0|_{n+m}(H^n \otimes B^\dagger)F(A \otimes I^m)|0\rangle_{n+m}$ is the amplitude of $|0\rangle_{n+m}$ at the end of the quantum computation.

In some embodiments, the extended weighted sum of hashed function values may be a mean value of the real-valued function $f$. For example, values of the real-valued weights in the distribution of real-valued weights may be equal to 1, and the operator A may comprise a second series of Hadamard gates. Given $A=H^n$ and $w_k=1$ for $0 \leq k < N$ with $N=2^n$, the weighted sum value given in Equation 4 may be computed with $a=1/N$. The mean value of $f$ may then be given by $$\frac{1}{N}\sum_{k=0}^{N-1} f(k) = \sqrt{\frac{(M-1)M(2M-1)}{6}} E_{|0\rangle},$$

where $E_{|0\rangle} = \langle 0|_{n+m}(H^n \otimes B^\dagger)F(A \otimes I^m)|0\rangle_{n+m}$ is the amplitude of $|0\rangle_{n+m}$ at the end of the quantum computation.

In some embodiments, the extended weighted sum of hashed function values may be a price of a financial product. In these embodiments, the real-valued function $f$ may be a payoff function of a financial product, the real-valued hash function h may return zero for input values below a specified cutoff, and the real-valued hash function h may return a linear function for values at or above the specified cutoff. For example, the cutoff may be a strike price K, and the price distribution may be represented by the values $w_k$. The price may then be computed by the expression $$\sum_{\substack{0 \leq k < N \\ f(k) \geq K}} w_k(f(k) - K).$$

The weighted sum of hashed function values may then be applied using an appropriate choice of the real-valued hash function h, given by $$h(v) = \begin{cases} v - K, & \text{if } v \geq K \\ 0, & \text{otherwise.} \end{cases}$$

Returning to FIG. 4A, as shown by operation 408, the apparatus 200 includes means, such as memory 204, communications hardware 206, state transformation circuitry 210, or the like, for utilizing the quantum state encoding the extended weighted sum of hashed function values with a second sequence of operators, wherein the second sequence of operators alters or transfers the quantum state encoding the extended weighted sum of hashed function values. The quantum state encoding the extended weighted sum of hashed function values may be utilized in various example embodiments by measuring, storing, or further transforming the quantum state encoding the extended weighted sum of hashed function values, or by a combination thereof.

In some embodiments, the state transformation circuitry 210 may utilize the quantum state encoding the extended weighted sum of hashed function values with a second sequence of operators comprising operators measuring the quantum state encoding the extended weighted sum of hashed function values. The measurement may be accomplished by the state transformation circuitry 210 applying a measurement operation on one or more qubits from the sets of qubits in the quantum circuit. Measuring the quantum state of a qubit may collapse the wave function of the quantum state and produce an observable value. The measurement may be made with respect to a particular basis. For example, the measurement may be made with respect to the computational basis, producing a binary result analogous to a classical computer. Measurements may be made with respect to other bases depending on the particular embodiment. The result of the measurement value may be converted to a form usable in other circuitry after the measurement operation is applied. For example, the measurement may be collected as digital data and stored by a memory (e.g., memory 204 and/or storage device 106) in a histogram along with other repeated measurements as part of a larger experiment. The measurement may also be used as input to other circuitry such as classical or quantum devices, via the use of communications hardware 206.

In some embodiments, the state transformation circuitry 210 may utilize the quantum state encoding the extended weighted sum of hashed function values with a second sequence of operators comprising operators storing the information from the quantum state encoding the extended weighted sum of hashed function values. Storing may be accomplished by first identifying a target storage device. Quantum states may not be copied in the way that classical information may be copied, due to the results of the no-cloning theorem. The target storage device may be classical in nature, first requiring a measurement of the quantum state encoding the extended weighted sum of hashed function values, or quantum in nature, requiring a transfer of the quantum state encoding the extended weighted sum of hashed function values. For example, if the quantum state encoding the extended weighted sum of hashed function values were to be used in a quantum circuit for a later computation, it may be moved to a form of quantum memory, or QRAM, allowing the quantum state encoding the extended weighted sum of hashed function values to be used later without performing a measurement. Information in the quantum state encoding the extended weighted sum of hashed function values may therefore be stored by performing a transfer or measurement of the quantum state. A transfer of the quantum state encoding the extended weighted sum of hashed function values may be performed, replacing the original quantum state but transporting it to another device. The stored quantum state may then be measured, transferred again, or operated on again in another way. A measurement may be performed, causing a wave function collapse, permanently altering the quantum state encoding the extended weighted sum of hashed function values. Once the measurement has been performed, transfer of the data via a remote host or local storage device may be performed transforming the quantum state encoding the extended weighted sum of hashed function values with a quantum circuit.

The quantum state encoding the extended weighted sum of hashed function values may be utilized with a second sequence of operators comprising operators transforming the quantum state encoding the extended weighted sum of hashed function values. Transforming may be accomplished by the state transformation circuitry 210 applying a sequence of operations, the sequence of operations comprising a number of quantum gates and measurements. The quantum gates and measurements may make up a quantum circuit intended for a particular task. The resulting quantum state of the sets of qubits may then be further utilized. The resulting quantum state of the set of qubits may contain information such as the result of a calculation. Further transformations may be applied, or the quantum state of the set of qubits may be measured or stored as described above. In some embodiments, the state transformation circuitry 210 may transform the quantum state encoding the extended weighted sum of hashed function values by entangling the first set of n qubits and/or the second set of m qubits with a third set of qubits. The entanglement may occur before, during, or after the initial quantum state is transformed into the quantum state encoding the extended weighted sum of hashed function values. Entangling the sets of qubits may enable further operations to utilize the encoding of the extended weighted sum of hashed function values.

As described above, example embodiments provide methods and apparatuses that enable improved quantum computation of weighted sums. Example embodiments thus provide tools that expand the scope of practical problems that may be solved using quantum computers. Moreover, example embodiments may automate several fundamental computations that may benefit from quantum parallelism to operate on large data sets, such as computation of expected or mean values. Finally, embodiments described herein expand the capabilities of general-purpose quantum computing devices, enabling them to efficiently perform calculations vital to activity in financial engineering, machine learning, and other fields, including performing such calculations with real-valued functions.

As these examples all illustrate, example embodiments contemplated herein provide technical solutions that solve real-world problems faced when computing weighted sums with quantum computers. While the efficient computation of weighted sums has been a challenging problem for decades, the expanding demand to deal with larger and larger datasets on shorter timescales in order to remain competitive has increased the demand for new computing techniques. At the same time, increased exploration of quantum computing from both public and private sectors has led to greatly increased accessibility of quantum computing and a rapid growth in the understanding of new algorithms, patterns and techniques, and example embodiments described herein thus represent a solution to these real-world problems.

FIGS. 4A and 4B illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for a quantum computation of a weighted sum of hashed values of a real-valued function $f$, the method comprising:

initializing, via state initialization circuitry, a first set of n qubits and a second set of m qubits by preparing the first set of n qubits and the second set of m qubits in initial quantum states;

transforming, via state transformation circuitry, the initial quantum state of the first set of n qubits and the initial quantum state of the second set of m qubits into a quantum state encoding the weighted sum of hashed values of $f$ using a first sequence of operators comprising:

an operator A that encodes a distribution of real-valued weights;

an operator F' that transforms the quantum state encoding the distribution of real-valued weights on the first set of n qubits and the initial quantum state of the second set of m qubits into an entangled quantum state encoding the real-valued function $f$, wherein amplitudes of the entangled quantum state are real-valued, wherein the operator F' comprises a one or more of an operator $U_\gamma(\theta)$ that is controlled on a subset of qubits from the first set of n qubits, wherein the one or more of the operator $U_\gamma(\theta)$ prepares a quantum state with amplitudes forming a geometric sequence representing the real-valued function $f$, an operator H'', comprising a series of Hadamard gates, and an operator $B_f$ that encodes a real-valued hash function as quantum amplitudes; and utilizing, via the state transformation circuitry, the quantum state encoding the weighted sum of hashed values of $f$ with a second sequence of operators, wherein the second sequence of operators alters or transfers the quantum state encoding the weighted sum of hashed values of $f$.

2. The method of claim 1, wherein:

the operator A encodes the distribution of real-valued weights as quantum amplitudes $a_k$ in the quantum state of the first set of n qubits, and the operator $B^\dagger$ is a Hermitian conjugate of an operator B that encodes the real-valued hash function h as the quantum amplitudes $b_v$, wherein applying the operators H'' and $B^\dagger$ to the first set of n qubits and second set of m qubits in the entangled quantum state results in the quantum state encoding the weighted sum of hashed values of $f$.

3. The method of claim 2, wherein the operator F' comprises:

an operator $H^{n+m}$, wherein the operator $H^{n+m}$, comprises a second series of Hadamard gates;

a third sequence of operators comprising the one or more of the operator $U_\gamma(\theta)$, an inverse quantum Fourier transform, wherein applying the inverse quantum Fourier transform to the second set of m qubits in the quantum state with quantum amplitudes forming the geometric sequence representing the real-valued function $f$ prepares a quantum state encoding the real-valued function $f$ in complex-valued amplitudes; and an operator $R_l$ that, when applied to the first set of n qubits and the second set of m qubits in the quantum state encoding the real-valued function $f$ in complex-valued amplitudes, removes phase rotations to produce an entangled quantum state encoding the real-valued function $f$ with real-valued amplitudes.

4. The method of claim 2, wherein:

the weighted sum of hashed values of $f$ is an expected value of the real-valued function $f$, and the real-valued hash function h is an identity function.

5. The method of claim 4, wherein:

the weighted sum of hashed values of $f$ is a mean value of the real-valued function $f$ values of the real-valued weights in the distribution of real-valued weights are equal to 1, and the operator A comprises a second series of Hadamard gates.

6. The method of claim 2, wherein the weighted sum of hashed values of $f$ is a price of a financial product, the real-valued function $f$ is a payoff function of a financial product, and the real-valued hash function h returns zero for input values below a specified cutoff, and the real-valued hash function h returns a linear function for values at or above the specified cutoff.

7. The method of claim 1, wherein the second sequence of operators comprises:

an operator measuring the quantum state encoding the weighted sum of hashed values of $f$;

an operator storing information from the quantum state encoding the extended weighted sum of hashed function values;

an operator further transforming the quantum state encoding the extended weighted sum of hashed function values with a quantum circuit; or a combination thereof.

8. The method of claim 1, further comprising:

transpiling, via transpilation circuitry, the first sequence of operators to obtain a transpiled quantum circuit, wherein the transpiled quantum circuit causes the transforming of the initial quantum state of the first set of n qubits and the initial quantum state of the second set of m qubits.

9. The method of claim 1, further comprising:

transpiling, via transpilation circuitry, the second sequence of operators to obtain a transpiled quantum circuit, wherein the transpiled quantum circuit causes the utilizing of the quantum state encoding the weighted sum of hashed values of $f$.

10. The method of claim 1, further comprising:

transpiling, via transpilation circuitry, the first sequence of operators and the second sequence of operators to obtain a transpiled quantum circuit, wherein the transpiled quantum circuit causes the transforming of the initial quantum state of the first set of n qubits and the initial quantum state of the second set of m qubits $f$.

11. The method of claim 1, further comprising:

acquiring, via communications hardware, user input providing attributes of:

the distribution of real-valued weights, the real-valued function $f$, the real-valued hash function h, or a combination thereof;

wherein transforming the initial quantum state of the first set of n qubits and the initial quantum state of the second set of m qubits utilizes the attributes acquired from the user input.

12. An apparatus for a quantum computation of a weighted sum of hashed values of a real-valued function $f$, the apparatus comprising:

state initialization circuitry configured to:

initialize a first set of n qubits and a second set of m qubits by preparing the first set of n qubits and the second set of m qubits in initial quantum states; and state transformation circuitry configured to:

transform the initial quantum state of the first set of n qubits and the initial quantum state of the second set of m qubits into a quantum state encoding the weighted sum of hashed values of $f$ using a first sequence of operators comprising:

an operator A that encodes a distribution of real-valued weights;

an operator F' that transforms the quantum state encoding the distribution of real-valued weights on the first set of n qubits and the initial quantum state of the second set of m qubits into an entangled quantum state encoding the real-valued function $f$, wherein amplitudes of the entangled quantum state are real-valued, wherein the operator F' comprises a one or more of an operator $U_\gamma(\theta)$ that is controlled on a subset of qubits from the first set of n qubits, wherein the one or more of the operator $U_\gamma(\theta)$ prepares a quantum state with amplitudes forming a geometric sequence representing the real-valued function $f$,
an operator $H''$, comprising a series of Hadamard gates, and
an operator $B^\dagger$ that encodes a real-valued hash function as quantum amplitudes, and
utilize the quantum state encoding the weighted sum of hashed values of $f$ with a second sequence of operators, wherein the second sequence of operators alters or transfers the quantum state encoding the weighted sum of hashed values of $f$.

13. The apparatus of claim 12, wherein:
the operator A encodes the distribution of real-valued weights as quantum amplitudes $a_k$ in the quantum state of the first set of n qubits, and
the operator $B^\dagger$ is a Hermitian conjugate of an operator B that encodes the real-valued hash function h as the quantum amplitudes $b_v$, wherein applying the operators $H''$ and $B^\dagger$ to the first set of n qubits and second set of m qubits in the entangled quantum state results in the quantum state encoding the weighted sum of hashed values of $f$.

14. The apparatus of claim 13, wherein the operator F' comprises:
an operator $H''^{n+m}$, wherein the operator $H''^{n+m}$, comprises a second series of Hadamard gates;
a third sequence of operators comprising the one or more of the operator $U_\gamma(\theta)$,
an inverse quantum Fourier transform, wherein applying the inverse quantum Fourier transform to the second set of m qubits in the quantum state with quantum amplitudes forming the geometric sequence representing the real-valued function $f$ prepares a quantum state encoding the real-valued function $f$ in complex-valued amplitudes; and
an operator $R_f$, wherein the operator $R_f$, when applied to the first set of n qubits and the second set of m qubits in the quantum state encoding the real-valued function $f$ in complex-valued amplitudes, removes phase rotations to produce an entangled quantum state encoding the real-valued function $f$ with real-valued amplitudes.

15. The apparatus of claim 13, wherein:
the weighted sum of hashed values of $f$ is an expected value of the real-valued function $f$, and
the real-valued hash function h is an identity function.

16. The apparatus of claim 15, wherein:
the weighted sum of hashed values of $f$ is a price of a financial product,
the real-valued function $f$ is a payoff function of a financial product, and
the real-valued hash function h returns zero for input values below a specified cutoff, and the real-valued hash function h returns a linear function for values at or above the specified cutoff.

17. The apparatus of claim 13, wherein the state transformation circuitry is further configured such that the second sequence of operators comprises:
operators measuring the quantum state encoding the weighted sum of hashed values of $f$;

operators storing information from the quantum state encoding the extended weighted sum of hashed function values;
operators further transforming the quantum state encoding the extended weighted sum of hashed function values with a quantum circuit; or
a combination thereof.

18. The apparatus of claim 12, further comprising:
transpilation circuitry configured to:
transpile the first sequence of operators and the second sequence of operators to obtain a transpiled quantum circuit,
wherein the transpiled quantum circuit causes the transforming of the initial quantum state of the first set of n qubits and the initial quantum state of the second set of m qubits and the utilizing of the quantum state encoding the weighted sum of hashed values of $f$.

19. The apparatus of claim 12, further comprising:
communications hardware, configured to:
acquire user input providing attributes of:
a distribution of real-valued weights,
the real-valued function $f$,
a real-valued hash function h, or
a combination thereof;
wherein the state transformation circuitry is further configured such that transforming the initial quantum state of the first set of n qubits and the initial quantum state of the second set of m qubits utilizes the attributes acquired from the user input.

20. An apparatus for a quantum computation of a weighted sum of hashed values of a real-valued function $f$, the apparatus comprising:
means for initializing a first set of n qubits and a second set of m qubits by preparing the first set of n qubits and the second set of m qubits in initial quantum states;
means for transforming the initial quantum state of the first set of n qubits and the initial quantum state of the second set of m qubits into a quantum state encoding the weighted sum of hashed values of $f$ using a first sequence of operators comprising:
an operator A that encodes a distribution of real-valued weights;
an operator F' that transforms the quantum state encoding the distribution of real-valued weights on the first set of n qubits and the initial quantum state of the second set of m qubits into an entangled quantum state encoding the real-valued function $f$, wherein amplitudes of the entangled quantum state are real-valued, wherein the operator F' comprises a one or more of an operator $U_\gamma(\theta)$ that is controlled on a subset of qubits from the first set of n qubits, wherein the one or more of the operator $U_\gamma(\theta)$ prepares a quantum state with amplitudes forming a geometric sequence representing the real-valued function $f$,
an operator $H''$, comprising a series of Hadamard gates, and
an operator $B^\dagger$ that encodes a real-valued hash function as quantum amplitudes; and
means for utilizing the quantum state encoding the weighted sum of hashed values of $f$ with a second sequence of operators, wherein the second sequence of operators alters or transfers the quantum state encoding the weighted sum of hashed values of $f$.

* * * * *